(12) United States Patent
Murakami

(10) Patent No.: US 11,649,113 B2
(45) Date of Patent: May 16, 2023

(54) CONVEYANCE DEVICE

(71) Applicant: MAKINO J CO., LTD., Kanagawa (JP)

(72) Inventor: Noboru Murakami, Kanagawa (JP)

(73) Assignee: MAKINO J CO., LTD., Kanagawa (JP)

( * ) Notice: Subject to any disclaimer, the term of this patent is extended or adjusted under 35 U.S.C. 154(b) by 0 days.

(21) Appl. No.: 17/605,912

(22) PCT Filed: Mar. 6, 2020

(86) PCT No.: PCT/JP2020/009836
§ 371 (c)(1),
(2) Date: Oct. 22, 2021

(87) PCT Pub. No.: WO2020/217737
PCT Pub. Date: Oct. 29, 2020

(65) Prior Publication Data
US 2022/0212866 A1 Jul. 7, 2022

(30) Foreign Application Priority Data
Apr. 26, 2019 (JP) .............................. JP2019-086654

(51) Int. Cl.
*B65G 1/04* (2006.01)
*B66F 9/075* (2006.01)
*B66F 9/20* (2006.01)

(52) U.S. Cl.
CPC ......... *B65G 1/0407* (2013.01); *B65G 1/0435* (2013.01); *B66F 9/0755* (2013.01); *B66F 9/20* (2013.01)

(58) Field of Classification Search
CPC ....... B65G 1/0435; B65G 1/0407; B66F 9/20; B66F 9/0755
See application file for complete search history.

(56) References Cited

U.S. PATENT DOCUMENTS

| 4,861,223 A | 8/1989 | Olson |
| 5,297,916 A | 3/1994 | Fujikawa et al. |
| 2019/0241415 A1* | 8/2019 | Tanaka .................. B65G 1/0407 |

FOREIGN PATENT DOCUMENTS

| JP | H02-135510 A | 5/1990 |
| JP | H08-290767 A | 11/1996 |

(Continued)

OTHER PUBLICATIONS

International Search Report for PCT/JP2020/009836 (dated Jun. 2, 2020).

(Continued)

*Primary Examiner* — Kaitlin S Joerger
(74) *Attorney, Agent, or Firm* — Merchant & Gould P.C.

(57) ABSTRACT

A conveyance device (100) comprises: a base member (81); a holding member (83) that moves along the base member (81); a motor (M) for advancing and retracting the holding member (83); a target (T) provided on the holding member (83); an optical distance sensor (86) positioned so as to face the target (T) when the holding member (83) is in the advanced position; and a control device (70). A processor (71) is configured such that: a basic rotation speed is applied to the motor (M) to advance the holding member (83); the actual distance from the optical distance sensor (86) to the advanced target (T) is measured by the optical distance sensor (86); a corrected distance for moving the holding member (83) to the advanced position is calculated on the basis of the measured actual distance; and the motor (M) moves the holding member (83) on the basis of the calculated corrected distance.

4 Claims, 7 Drawing Sheets

(56) References Cited

FOREIGN PATENT DOCUMENTS

| JP | 2001233405 | A | * | 8/2001 | ........... | B65G 1/0435 |
| JP | 2005263411 | A | * | 9/2005 | | |
| JP | 6727375 | B1 | * | 7/2020 | ........... | B65G 1/0407 |

OTHER PUBLICATIONS

Search Report for European Patent Application No. 20795531.1 (dated Jan. 2, 2023).

* cited by examiner

CONVEYANCE DEVICE

This application is a National Stage Application of PCT/JP2020/009836, filed Mar. 6, 2020, which claims benefit of priority to Japanese Patent Application No. 2019-086654, filed Apr. 26, 2019, which applications are incorporated herein by reference. To the extent appropriate, a claim of priority is made to each of the above disclosed applications.

FIELD

The present invention relates to a conveyance device.

BACKGROUND

Conventionally, conveyance devices which convey products such as workpieces or loads acquired from a storage shelf are known. In order to access the storage shelf, such conveyance devices comprise a holding member which holds products and which advances and retracts relative to the storage shelf.

In connection with such conveyance devices, for example, Patent Literature 1 discloses a stacker crane. This stacker crane comprises a base part affixed to an elevating platform, an intermediate plate which moves on the base part, and a top plate which moves on the intermediate plate. The stacker crane of Patent Literature 1 is configured so as to detect elongation of the top plate when the load collapses. Specifically, a limit switch is provided on an upper surface of the top plate, and the limit switch is configured so as to be turned on when a product shifted from the normal position comes into contact with the limit switch. Further, a light-emitting part of a photoelectric switch is provided on a side surface of the top plate, and the light-emitting part is configured so as to emit light when the limit switch is turned on. Further, the elevating platform is provided with a light-receiving part of the photoelectric switch. The light-emitting part and the light-receiving part are positioned and oriented so as to face each other when the intermediate plate and the top plate are extended. Due to such a configuration, elongation of the top plate is detected.

CITATION LIST

Patent Literature

[PTL 1] Japanese Unexamined Utility Model Publication No. 02-135510
[PTL 2] Japanese Unexamined Patent Publication (Kokai) No. 08-290767

SUMMARY

Technical Problem

In such conveyance devices, the advanced position of the holding member, which advances and retracts relative to the storage shelf, may shift due to various factors. If the advanced position shifts, the holding member may not be able to properly access the storage shelf.

For example, chains are frequently used for the driving of holding members as described above. Since chains generally elongate with use, if the chain elongates, the advanced position of the holding member may shift. Without being limited to the field of conveyance devices as described above, chains generally elongate with use, and various technologies for compensating for chain elongation have been proposed. For example, in the chain elongation measurement device of Patent Literature 2, a pitch length between center links of the chain is measured using a photoelectric switch. However, in conveyance devices, the elongation of the entire chain can change with each advance, depending on various factors such as the weight of the product. Thus, even if the chain elongation measurement device described above is used, it may not be possible to accurately determine the actual position of the holding member in each single advance.

In consideration of such problems, the present invention aims to provide a conveyance device with which an advanced position relative to a storage shelf can be automatically corrected.

Solution to Problem

An aspect of the present disclosure provides a conveyance device for conveying a product acquired from a storage shelf, the conveyance device comprising a base member which is moved along a plurality of stock areas of the storage shelf, a holding member which holds the product and which moves between an advanced position and a retracted position relative to the stock areas along a guide provided on the base member, a motor for advancing and retracting the holding member, a target provided on the holding member, an optical distance sensor for measuring a distance to the target, the optical distance sensor being arranged outside an area in which the holding member moves, being oriented so as to emit light in an inclined direction relative to a movement direction of the holding member, and being positioned so as to face the target of the holding member when the holding member is in the advanced position, and a controller for controlling the motor and the optical distance sensor, wherein a storage unit of the controller stores coordinate values of the advanced position and a basic rotational speed of the motor for moving the holding member to the advanced position, and a processor of the controller is configured so as to advance the holding member by imparting the basic rotational speed to the motor, measure, with the optical distance sensor, an actual distance of the advanced holding member from the optical distance sensor to the target, calculate a corrected distance for moving the holding member to the advanced position based on the coordinate values of the advanced position stored in the storage unit and the measured actual distance from the optical distance sensor to the target, and move the holding member with the motor based on the calculated corrected distance.

In the conveyance device according to the aspect of the present disclosure, first, the holding member is advanced by the motor in accordance with the basic rotational speed. The holding member is then again moved by the motor based on the corrected distance calculated based on the actual distance from the optical distance sensor to the target of the holding member. Thus, even if the actual position of the holding member shifts from the advanced position at the time of a first advance, depending on various factor such as the weight of the product, at the time of a second movement, the position of the holding member can be corrected based on the corrected distance calculated based on the actual distance. Thus, the advanced position relative to the storage shelf can be automatically corrected.

The conveyance device may further comprise an intermediate member which is configured so as to move along the guide of the base member between the base member and the holding member, the intermediate member may be driven relative to the base member by a first chain, and the holding member may be driven relative to the intermediate member by a second chain. In this case, the first chain and the second chain are used in the advancing of the holding member. As described above, chains elongate with use, and the elongation of the entire chain can change with each single advance, depending on various factors such as the weight of the product. In this aspect, the shifting of the holding member due to elongation of the chains can be automatically corrected.

The optical distance sensor may be positioned and oriented so as to be capable of measuring distances to the stock areas, and the controller may have an autonomous learning mode which is configured so as to measure an actual distance to each stock area with the optical distance sensor, determine the advanced position of the holding member relative to each stock area based on the measured actual distance from the optical distance sensor to each stock area, calculate the basic rotational speed of the motor for each stock area based on the determined advanced position for each stock area, and store the calculated basic rotational speed for each stock area in the storage unit. The distances to the stock areas can vary among the plurality of stock areas depending on various factors (for example, storage shelf assembly accuracy, earthquakes, etc.). In the conveyance device according to this aspect, the advanced position can be autonomously learned for each stock area by the autonomous learning mode. Thus, even if the distances to the stock areas vary, the holding member can properly access each stock area.

The optical distance sensor may be positioned and oriented so as to be capable of emitting light toward the stock areas, and the controller may have a product confirmation mode which is configured so as to judge that the product is present in the stock areas when light emitted toward the stock areas returns to the optical distance sensor within a predetermined period, and judge that the product is not present in the stock areas when the light emitted toward the stock areas does not return to the optical distance sensor within the predetermined period. In this case, for example, it is possible to prevent accidental conveyance of another product to a stock area in which a product is already present.

Advantageous Effects of Invention

According to the aspects of the present disclosure, a conveyance device with which an advanced position relative to a storage shelf can be automatically corrected can be provided.

DESCRIPTION OF EMBODIMENTS

The conveyance device according to an embodiment will be described below with reference to the attached drawings.

Identical or corresponding elements have been assigned the same reference sign, and duplicate descriptions thereof have been omitted. In order to facilitate understanding, the scales of the drawings have been changed in some cases.

Figure 1:
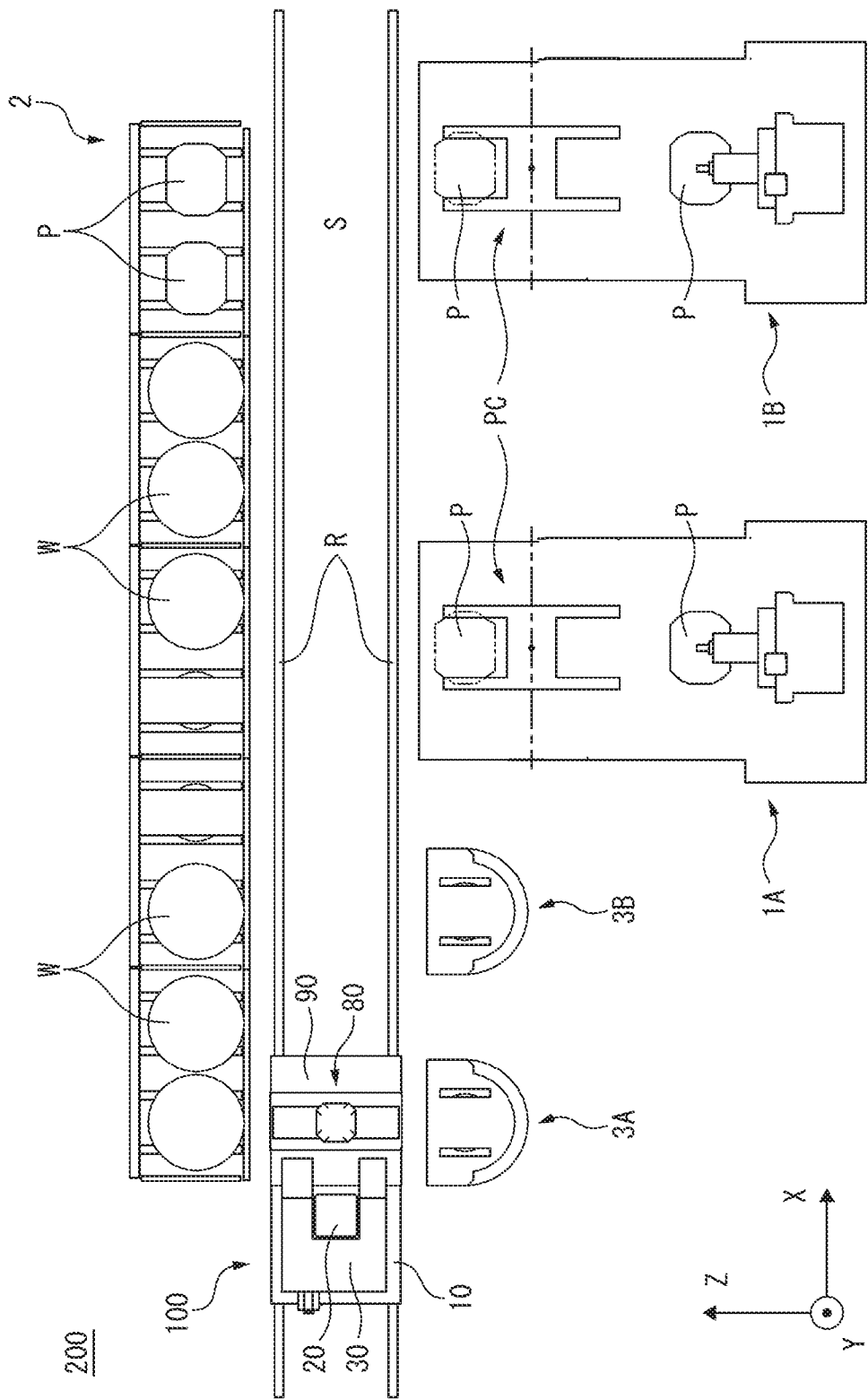
FIG. 1 is a top view showing a system comprising a conveyance device according to an embodiment.
Figure 2:
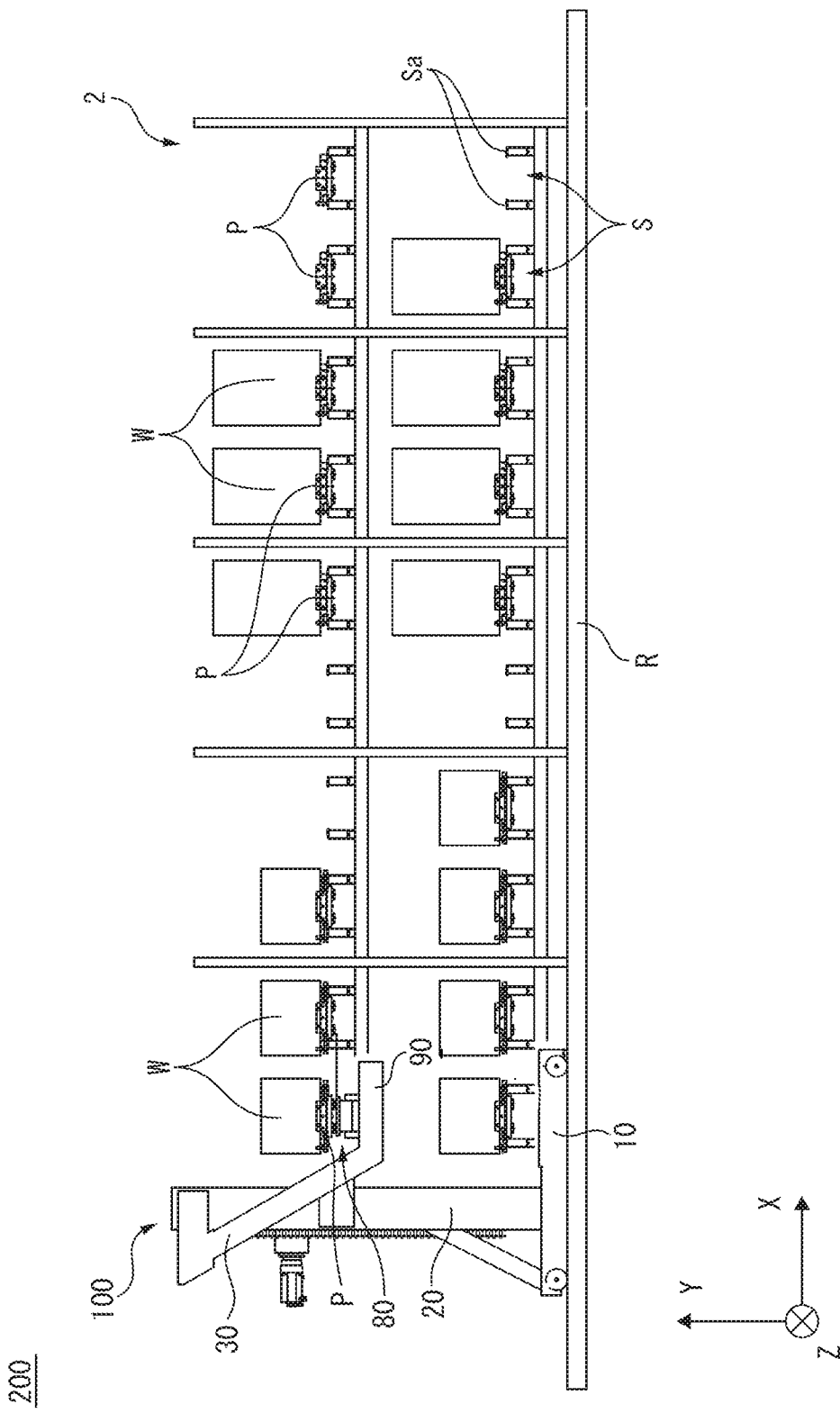
FIG. 2 is a side view showing the system of FIG. 1.

FIG. 1 is a top view showing a system 200 comprising a conveyance device 100 according to an embodiment, and FIG. 2 is a side view showing the system 200 of FIG. 1. Referring to FIG. 1, the conveyance device 100 travels between a plurality of locations along rails R, and can transport various products. For example, in the present embodiment, the conveyance device 100 is used in a factory for machining workpieces W. Specifically, in the system 200, the conveyance device 100 conveys workpieces W acquired from processing machines 1A, 1B, a pallet stocker (storage shelf) 2, and workpiece setup stations (WSS, hereinafter referred to simply as "stations") 3A, 3B therebetween. Referring to FIG. 2, the workpiece W may be attached to, for example, a pallet P, and the pallet P may be transported by the conveyance device 100. In another embodiment, workpieces W may be conveyed directly by the conveyance device 100. In another embodiment, the conveyance device 100 may transport other products. For example, the conveyance device 100 may transport loads between a plurality of shelves in a warehouse. Note that in FIG. 2, in order to facilitate understanding, the processing machines 1A, 1B and the stations 3A, 3B are not shown.

Referring to FIG. 1, the processing machines 1A, 1B can be, for example, any of various types of machine tool such as a machining center. For examples, each of the processing machines 1A, 1B comprises a pallet changer PC which is capable of exchanging a pallet P having an unmachined workpiece W with a pallet P having a machined workpiece W. In the stations 3A, 3B, an operator can attach a workpiece W to a pallet P and remove a workpiece W from a pallet P. Referring to FIG. 2, the pallet stocker 2 can house pallets P with and without workpieces W. The pallet stocker 2 has a plurality of stock areas S for housing pallets P (2 rows by 10 columns in FIG. 2). For example, each stock area S can have a pair of leg members Sa for supporting a pallet P. The conveyance device 100, the processing machines 1A, 1B, and the stations 3A, 3B may comprise individual controllers (local controllers), and the system 200 may comprise a controller (main controller) capable of communicating with these local controllers.

The conveyance device 100 comprises a carriage 10, a support column 20, an elevating device 30, a slide device 80, and a loading platform 90. Further, referring to FIG. 3, the conveyance device 100 comprises a controller 70 for controlling the various components of the conveyance device 100. The conveyance device 100 may further comprise other components.

Referring to FIG. 1, the carriage 10 is configured so as to travel horizontally on the rails R. In the present embodiment, the carriage 10 travels on two rails R. In another embodiment, the carriage 10 may travel along one rail R. The travelling of the carriage 10 can be controlled by the controller 70.

Regarding the coordinate axes with respect to the conveyance device 100, the axis parallel to the direction in which the carriage 10 moves (also referred to as the "advancing direction") is the X-axis (also referred to as the "travel axis"). Relative to the support column 20, the side on which the loading platform 90 is present is the "front", and the side opposite thereto is the "rear." Among horizontal directions, the axis orthogonal to the front-rear direction is the left-right direction, and the axis parallel to the left-right direction (i.e., the horizontal axis orthogonal to the X-axis)

is the Z-axis (also referred to as the "transfer axis"). The axis parallel to the vertical direction (also referred to as the "up-down directions") is the Y-axis (also referred to as the "elevation axis"). The origin of the X-, Y-, and Z-axis coordinates can be set at an arbitrary point in the system 200.

The support column 20 protrudes vertically upward from the carriage 10. The elevating device 30 moves in the up-down directions along the support column 20. The loading platform 90 is supported by the elevating device 30, and is moved in the up-down directions by the elevating device 30. The slide device 80 is provided on the loading platform 90. The movement of the elevating device 30 can be controlled by the controller 70.

Next, the slide device 80 and the controller 70 will be described in detail.

Figure 3:
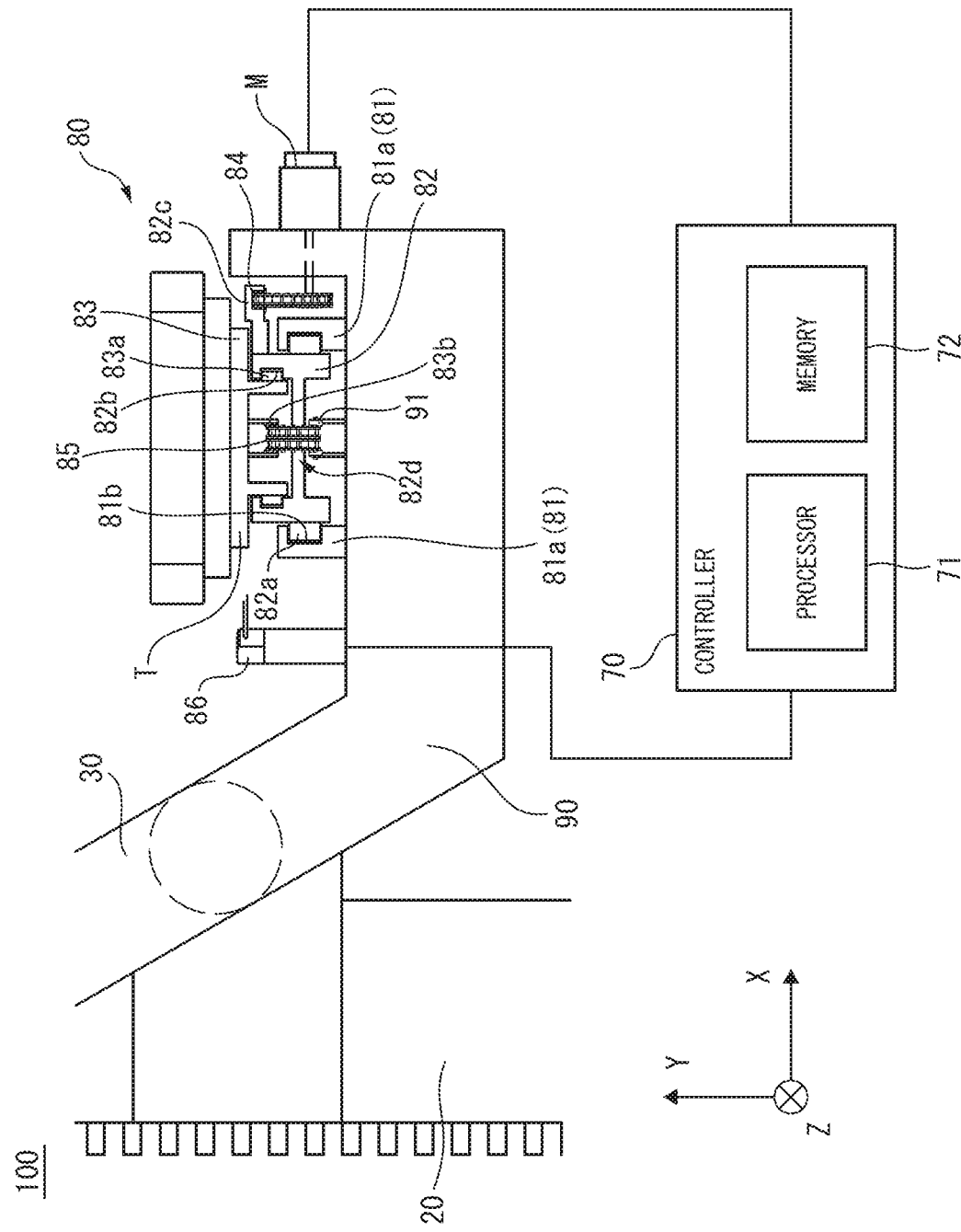
FIG. 3 is an enlarged schematic side view showing a slide device of the conveyance device of FIG. 1.
Figure 4:
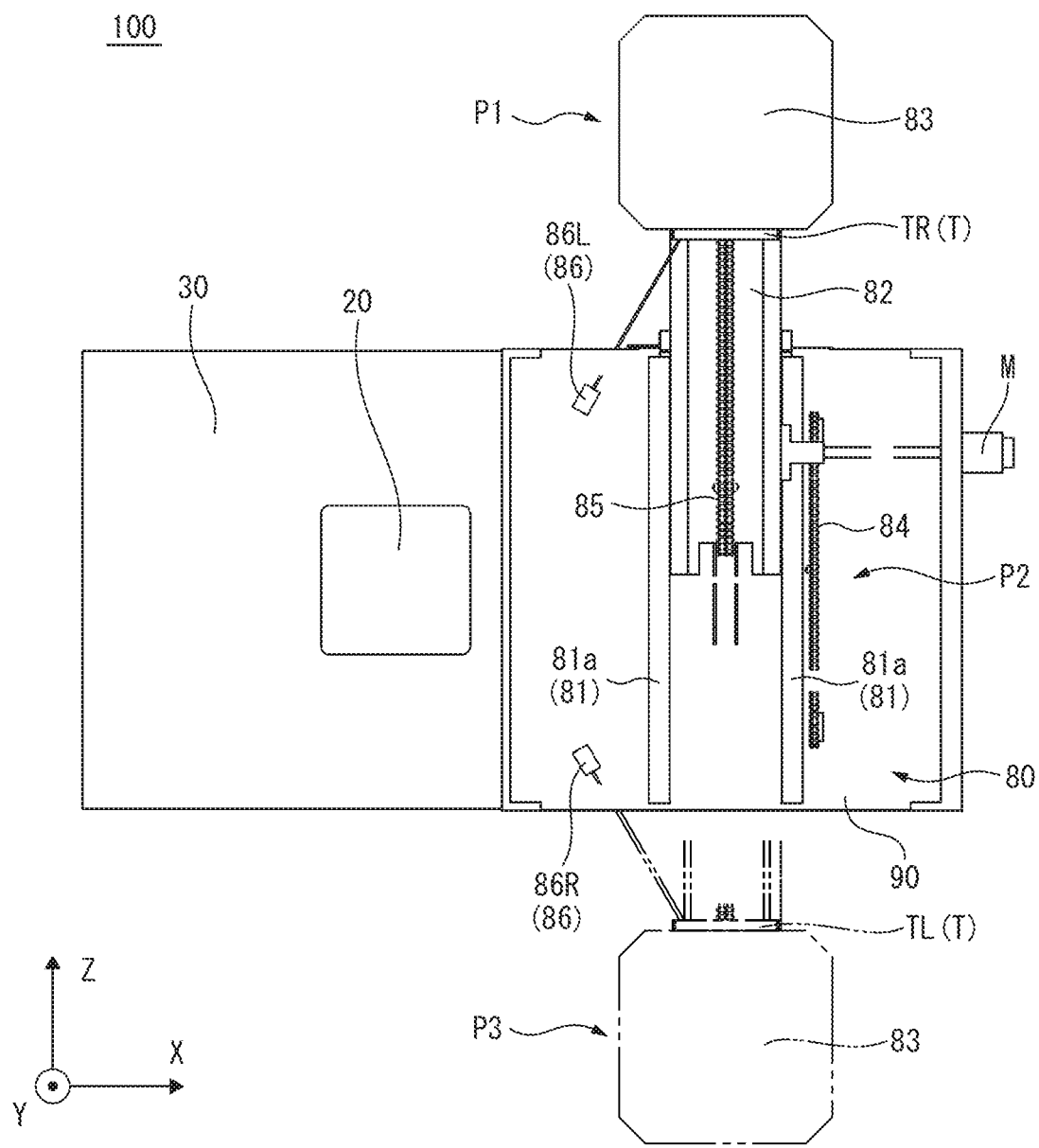
FIG. 4 is an enlarged schematic top view showing the slide device of the conveyance device of FIG. 1.

FIG. 3 is an enlarged schematic side view showing the slide device 80 of the conveyance device 100 of FIG. 1, and FIG. 4 is an enlarged schematic top view showing the slide device 80 of the conveyance device 100 of FIG. 1. Referring to FIG. 3, the slide device 80 comprises a base member 81, an intermediate member 82, and a holding member 83. The slide device 80 may further comprise other components.

Referring to FIG. 4, the base member 81 is affixed to the loading platform 90. The base member 81 can be moved in the X-direction and Y-direction along the plurality of stock areas S of the pallet stocker 2 by the loading platform 90 (refer to FIG. 2). Specifically, as the loading platform 90 is moved in the X-direction by the carriage 10 and moved in the Y-direction by the elevating device 30, the base member 81 on the loading platform 90 is also moved in the XY plane. Referring to FIG. 4, the base member 81 comprises a pair of symmetrical rails 81*a* which face each other in the X-direction. Each rail 81*a* extends along the Z-axis. Referring to FIG. 3, each rail 81*a* comprises a first guide 81*b* which extends along the Z-axis. The first guides 81*b* can be grooves.

The intermediate member 82 is provided between the base member 81 and the holding member 83, and moves in the Z-direction along the first guides 81*b* of the base member 81. Specifically, the intermediate member 82 has protrusions 82*a* which are inserted into the first guides 81*b*, and which slide on the first guides 81*b*. The intermediate member 82 extends along the Z-axis (refer to FIG. 4). Referring to FIG. 3, the intermediate member 82 includes second guides 82*b* which extend along the Z-axis. The second guides 82*b* can be, for example, grooves.

The holding member 83 holds the workpiece W via the pallet P. Specifically, the holding member 83 has a fork (not illustrated) which is capable of engaging with the pallet P. By raising the loading platform 90 in a state in which the fork of the holding member 83 is engaged with the pallet P, the pallet P and the workpiece W can be lifted from the pallet stocker 2. Furthermore, by lowering the loading platform 90 in a state in which the fork of the holding member 83 is engaged with the pallet P, the pallet P and the workpiece W can be placed on the pallet stocker 2. The holding member 83 moves in the Z-direction along the second guides 82*b* of the intermediate member 82 and the first guides 81*b* of the base member 81. Specifically, the holding member 83 has protrusions 83*a* which are inserted into the second guides 82*b* and slides on the second guides 82*b*. Furthermore, the holding member 83 is moved along with the intermediate member 82 along the first guides 81*b* as the intermediate member 82 slides on the first guides 81*b*.

Referring to FIG. 4, the holding member 83 moves between an advanced position P1 relative to the pallet stocker 2, a retracted position P2, and an advanced position P3 relative to the processing machines 1A, 1B and the stations 3A, 3B. In the advanced position P1, the holding member 83 can access the stock areas S. In the advanced position P3, the holding member 83 can access the processing machines 1A, 1B and the stations 3A, 3B. In the retracted position P2, the holding member 83 can be positioned above the loading platform 90. The retracted position P2 can, for example, be the center of the loading platform 90 in the Z-direction. Positions P1, P2, and P3 can be set so as to correspond to a representative point (for example, the center) of the holding member 83.

Referring to FIG. 3, the slide device 80 comprises a so-called "double-speed/double-stroke mechanism" for driving the holding member 83, and comprises a first chain 84, a second chain 85, and a motor M. Specifically, the motor M can be, for example, a servo motor, and a shaft of the motor M is connected to a gear (not illustrated) for rotating the first chain 84. The intermediate member 82 comprises a linear guide member (for example, a rack) 82*c* which meshes with the first chain 84. Furthermore, the intermediate member 82 comprises a gear 82*d* for rotating the second chain 85. An affixation member (for example, a rack) 91 which meshes with the second chain 85 is provided on the loading platform 90. The holding member 83 comprises a linear guide member (for example, a rack) 83*b* which meshes with the second chain 85.

When the motor M rotates, the first chain 84 is rotated by the motor M, and the linear guide member 82*c*, which meshes with the first chain 84, and the intermediate member 82 are moved along the Z-axis relative to the affixation member 91 by the first chain 84. When the intermediate member 82 moves, the second chain 85 and the holding member 83 are moved along the Z-axis along with the intermediate member 82. At the same time, since the second chain 85 meshes with the affixation member 91 of the loading platform 90, the second chain 85 is rotated by the affixation member 91 and the gear 82*d* of the intermediate member 82 while moving along the Z-axis. When the second chain 85 rotates, the linear guide member 83*b*, which meshes with the second chain 85, and the holding member 83 are moved along the Z-axis relative to the intermediate member 82 by the second chain 85. Specifically, the intermediate member 82 is driven relative to the base member 81 by the first chain 84, while the holding member 83 is driven along with the intermediate member 82 relative to the base member 81 by the first chain 84, and is driven relative to the intermediate member 82 by the second chain 85 (i.e., double-speed/double-stroke mechanism). The rotation of the motor M (i.e., the advancing and retraction of the holding member 83) can be controlled by the controller 70. As described above, since the movement (X-direction) of the carriage 10, the movement (Z-direction) of the elevating device 30, and the movement (Y-direction) of the holding member 83 are controlled by the controller 70, the controller 70 can determine the X-, Y-, and Z-axis coordinate values of the holding member 83. The representative point of the holding member 83 for determining the coordinate values can be set to an arbitrary point (for example, the center point) of the holding member 83.

Referring to FIG. 4, in order to correct the movement of the holding member 83 to the advanced position PI and the advanced position P3, the slide device 80 has a pair of targets T and a pair of optical distance sensors 86. Specifically, the pair of targets T are provided on both ends (left and right ends) of the holding member 83 in the Z-direction. The targets T are configured so as to be capable of reflecting light emitted from the optical distance sensors 86. The targets T can be planes parallel to the XY-plane, and extend along the X-direction. The targets T can be, for example, surfaces of the holding member 83.

The optical distance sensors 86 can be laser distance sensors which measure distance based on the time-of-flight (TOF) of light, and are configured so as to measure the distances to the targets T. The optical distance sensors 86 are provided outside of the area in which the holding member 83 moves. Specifically, the optical distance sensors 86 can be affixed to, for example, the loading platform 90. The optical distance sensors 86 are oriented so as to emit light in a direction which is inclined (for example, 30° relative to the Z-axis) relative to the movement direction (i.e., Z-direction) of the holding member 83.

One optical sensor 86L is positioned so as to face a right-side target TR of the holding member 83 when the holding member 83 is in the advanced position P1 or the vicinity thereof. Since the first chain 84 and the second chain 85 elongate due to use, after long-term use, the holding member 83 may move beyond the advanced position P1 (above the advanced position P1 in FIG. 4). Thus, preferably, the one optical sensor 86L is positioned so as to face the right-side target TR of the holding member 83 when the holding member 83 is in the advanced position P1 or therebeyond. However, the arrangement of the optical distance sensor 86L is not limited thereto, and alternatively, the optical distance sensor 86L may be positioned, for example, so as to face the target TR of the holding member 83 when the holding member 83 is within a predetermined range centered on the advanced position P1. Furthermore, the optical distance sensor 86L is oriented and positioned so as to be capable of measuring the distance to the stock areas S (for example, the distances to the corners of the leg members Sa of the stock areas S), whereby in the autonomous learning mode, the coordinate values of each stock area S can be obtained (which will be described in detail later). Further, the optical distance sensor 86L is oriented and positioned so as to be capable of emitting light toward the stock areas S when the holding member 83 is in a position facing the stock areas S, whereby in the product confirmation mode, it can be determined whether or not a product is present in a stock area S (which will be described in detail later).

The other optical distance sensor 86R is positioned so as to face a left-side target TL of the holding member 83 when the holding member 83 is in the advanced position P3 or the vicinity thereof. Since the first chain 84 and the second chain 85 elongate due to use, as described above, after long-term use, the holding member 83 may move beyond the advanced position P3 (below the advanced position P3 in FIG. 4). Thus, preferably, the other optical distance sensor 86R and the target TL are positioned so as to face the left-side target TL of the holding member 83 when the holding member 83 is in the advanced position P3 or therebeyond. However, the arrangement of the optical distance sensor 86R is not limited thereto, and alternatively, the optical distance sensor 86R may be positioned so as to face the target TL of the holding member 83 when, for example, the holding member 83 is within a predetermined range centered on the advanced position P3. Furthermore, the optical distance sensor 86R is oriented and positioned so as to be capable of emitting light toward the pallet changer PC and the stations 3A, 3B when the holding member 83 is in a position in which it faces the pallet changer PC and the stations 3A, 3B, whereby in the product confirmation mode, it can be determined whether or not a product is present on the pallet changer PC and in the stations 3A, 3B.

Referring to FIG. 3, the controller 70 is capable of wired or wireless communication with the optical distance sensors 86 and the motor M, and is configured so as to control the motor M and the optical distance sensors 86. The controller 70 comprises a processor 71 and a memory (storage unit) 72, and these components are connected to each other via busses (not illustrated) or the like. The controller 70 can comprise components such as ROM (read-only memory), RAM (random access memory), and input devices and/or output devices (for example, mouse, keyboard, liquid crystal display, and/or touch panel, etc.). The controller 70 may further comprise other components. The controller 70 can be attached to, for example, an arbitrary component of the conveyance device 100.

The processor 71 can comprise one or a plurality of CPUs (Central Processing Units). The processor 71 can execute various processes including the processes described below in accordance with, for example, a program stored in the memory 72.

The memory 72 can comprise, for example, one or a plurality of hard disk drives. The memory 72 stores various data such as, for example, coordinate values of each stock area S (for example, the coordinate values of the corners of the leg members Sa), coordinate values of the advanced positions P1, P3, and basic rotational speeds of the motor M for moving the holding member 83 to the advanced positions P1, P3. The coordinate values of the advanced position P1 and the basic rotational speed of the motor M are stored for each of the plurality of stock areas S (which will be described in detail later) using the autonomous learning mode. The memory 72 can store various programs used by the processor 71. The memory 72 may store other data.

Next, the advancing movement of the holding member 83 will be described.

Figure 5:
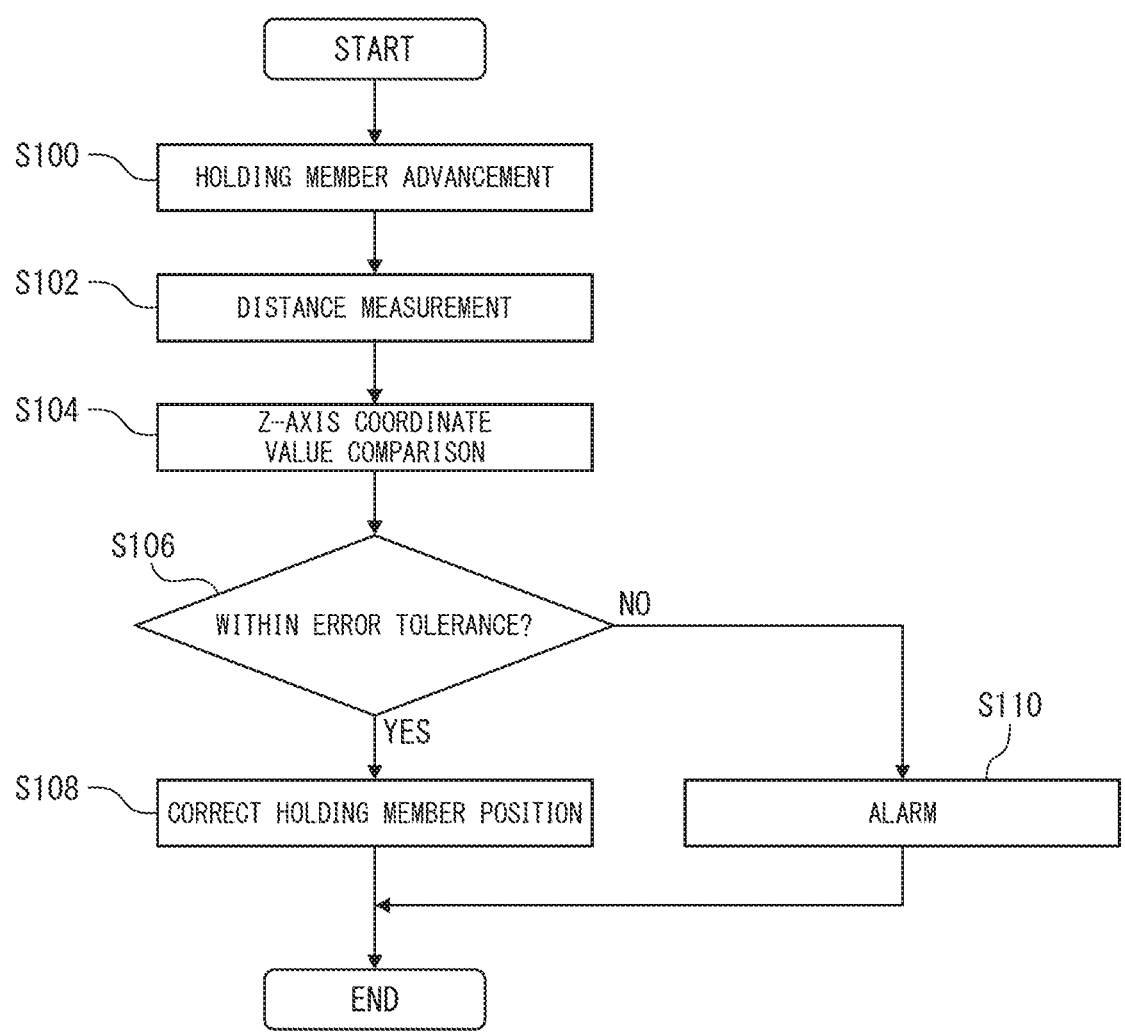
FIG. 5 is a flowchart showing an advancing movement of a holding member.

FIG. 5 is a flowchart showing the advancing movement of the holding member 83. Below, the case in which the holding member 83 moves to the advanced position P1 (i.e., the case in which the holding member 83 accesses the stock areas S) will be described. However, the conveyance device 100 can operate in the same manner in the case in which the holding member 83 moves to the advanced position P3 (i.e., the case in which the holding member 83 accesses the processing machines 1A, 1B or stations 3A, 3B).

When the loading platform 90 moves to a position facing a desired stock area S which is to be accessed by the holding member 83, the processor 71 reads the basic rotational speed of the motor M stored for the stock area S from the memory 72, and advances the holding member 83 by imparting the basic rotational speed to the motor M (step S100).

The processor 71 then issues a command to the optical distance sensor 86L and the actual distance from the optical distance sensor 86L to the target TR is measured by the optical distance sensor 86L (step S102). The processor 71 converts the measured distance (i.e., the distance inclined relative to the Z axis) into a distance parallel to the Z axis, whereby the actual Z-axis coordinate values of the holding member 83 are calculated.

The processor 71 then compares the Z-axis coordinate value of the advanced position P1 stored in the memory 72 with the measured actual Z-axis coordinate value of the holding member 83 (step S104). The processor 71 calculates the error (corrected distance) between the Z-axis coordinate value stored in the memory 72 and the actual Z-axis coordinate value.

The processor 71 then determines whether or not the error is within a tolerance (for example, ±several mm) (step S106). When it is determined in step S106 that the error is within the tolerance, the processor 71 calculates a corrected rotational speed of the motor M necessary to move the holding member 83 by only the calculated error and corrects the position of the holding member 83 by imparting the corrected rotational speed to the motor M (step S108), whereby the series of operations ends.

When it is determined in step S108 that the error is not within the tolerance, the processor 71 issues an alarm (step S110), and the series of operations ends. For example, the alarm may be a sound generated by the controller 70, and/or may be a message displayed on the controller 70. The operator can investigate the cause of the error not being within the tolerance (for example, elongation or tearing of the chains 84, 85, etc.) and address the problem (for example, tension adjustment or replacement of the chains 84, 85, etc.).

Next, the autonomous learning mode will be described.

As described above, the memory 72 stores the coordinate values of each stock area S, as well as the coordinate values of the advanced position P1 and the basic rotational speed of the motor M for accessing each stock area S. These can be acquired or updated by the autonomous learning mode. For example, if the autonomous learning mode is executed for the first time after installation of the pallet stocker 2, the values described above can be acquired by the autonomous learning mode. In this case, the memory 72 stores the design coordinate values of each stock area S prior to the autonomous learning mode. Further, for example, if the autonomous learning mode is executed regularly or when necessary (for example, after an earthquake), the values described above can be updated by the autonomous learning mode.

Figure 6:
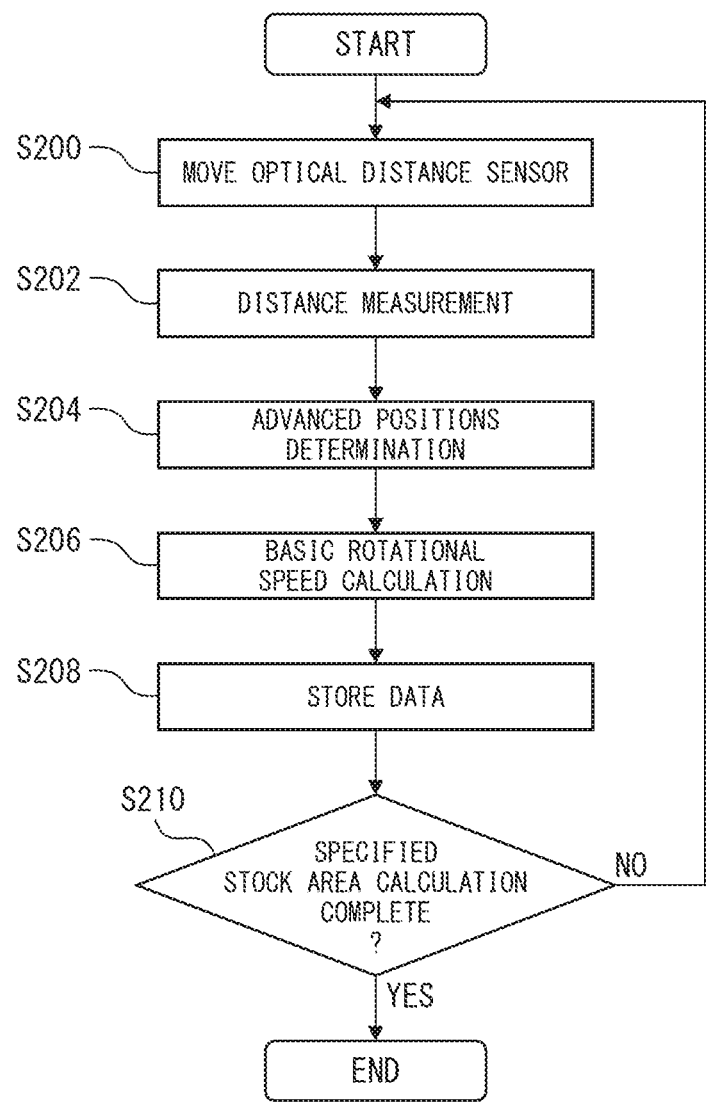
FIG. 6 is a flowchart showing an autonomous learning mode.

FIG. 6 is a flowchart showing the autonomous learning mode. The processor 71 reads the current coordinate values of the target stock area S (for example, the coordinate values of the corner of the leg member Sa) from the memory 72, and moves the loading platform 90 in the X-direction and Y-direction to the position in which the corresponding point can be measured by the optical distance sensor 86L (Step S200). For example, when the autonomous learning mode is first executed after installation of the pallet stocker 2, the "current coordinate values" can be the design coordinate values of each stock area S. In other cases, the "current coordinate values" can be the coordinate values of each stock area S obtained by the prior autonomous learning mode.

The processor 71 then issues a command to the optical distance sensor 86L, and the actual distance to each stock area S (for example, the corner of the leg member Sa) is measured by the optical distance sensor 86L (step S202). When needed, the processor 71 may fine-adjust the position of the loading platform 90 in the X-direction and Y-direction. The processor 71 converts the measured distance (i.e., the distance inclined relative to the Z-axis) into a distance parallel to the Z-axis, whereby the actual Z-axis coordinate values of the stock area S are calculated. As a result, the processor 71 can obtain the actual coordinate values of the stock areas S.

The processor 71 then determines the advanced positions P1 of the holding member 83 relative to the stock areas S based on the actual coordinate values of the stock areas S (step S204). For example, the distance from the corner of the leg member Sa to the advanced position P1 can be determined from the dimensions of each component, and the coordinate values of the advanced position P1 can be determined by adding this distance to the coordinate values of the corner of the leg member Sa measured in step S202.

The processor 71 then calculates the basic rotational speed of the motor M necessary to move the holding member 83 to the determined advanced position P1 (step S206). The processor 71 then stores the obtained data (the coordinate values of the stock area S (for example, the corner of the leg member Sa), the coordinate values of the advanced position P1, and the basic rotational speed of the motor M) in the memory 72 (step S208). The processor 71 then judges whether or not the calculation regarding the stock area S specified by the operator in advance is complete (step S210). When it is judged in step S210 that the calculation regarding the specified stock area S is complete, the series of operations ends. When it is judged in step S210 that the calculation regarding the specified stock area S is not complete, the processor 71 repeats S200 to S208 until the calculation regarding the specified stock area S is complete.

Next, the product confirmation mode will be described. Below, the case in which the presence of a product in a stock area S is judged using the optical distance sensor 86L will be described. However, the conveyance device 100 can operate in the same manner in the case in which the presence of a product on the pallet changer PC and stations 3A, 3B is judged using the optical distance sensor 86R.

Figure 7:
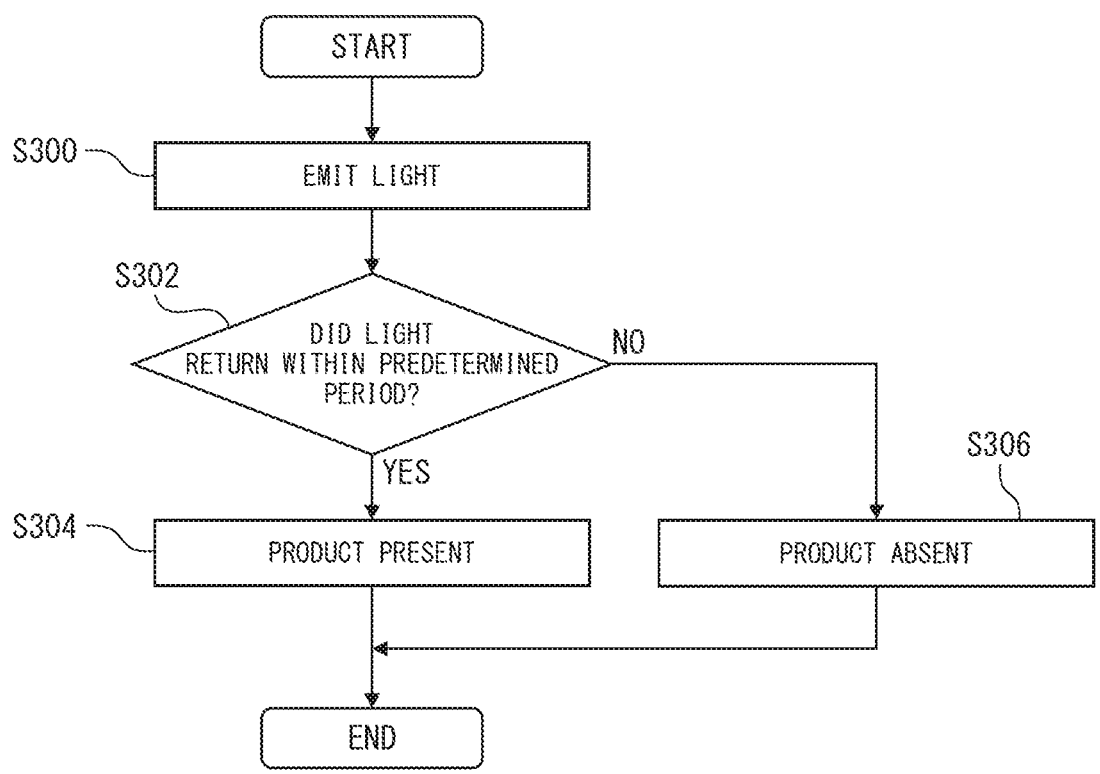
FIG. 7 is a flowchart showing a product confirmation mode.

FIG. 7 is a flowchart showing the product confirmation mode. When the loading platform 90 moves to a position in which the holding member 83 faces the target stock area S (for example, the stock area S in which the conveyance device 100 next places a pallet P), the processor 71 issues a command to the optical distance sensor 86L, which emits light toward the stock area. S (step S300). The processor 71 then judges whether or not the light emitted toward the stock area S returns to the optical distance sensor 86L within a predetermined period (step S302).

When it is judged in step S302 that the light has returned to the optical distance sensor 86L within the predetermined period, the processor 71 judges that a product is present in the stock area S (step S304), and the series of operations ends. In this case, for example, the processor 71 may issue an alarm. For example, the alarm may be a sound emitted from the controller 70, and/or may be a message displayed on the controller 70.

When it is judged in step S302 that the light did not return to the optical distance sensor 86L within the predetermined period, the processor 71 judges that a product is not present in the stock area S (step S306), and the series of operations ends. In this case, for example, the processor 71 may execute the advancing movement of the holding member 83 described above for the pallet P to be placed in the stock area S.

In the conveyance device 100 described above, in the advancing movement of the holding member 83, first, the holding member 83 is advanced by the motor M in accordance with the basic rotational speed. The holding member 83 is then moved again by the motor M based on the corrected distance calculated based on the actual distance from the optical distance sensor 86L to the target TR of the holding member 83. Thus, even if the actual position of the holding member 83 shifts from the advanced position P1 at the time of a first advance, depending on various factors such as, for example, the weight of the work piece W, the position of the holding member 83 can be corrected based on the calculated corrected distance at the time of a second movement. Thus, the advanced position for the pallet stocker 2 can be automatically corrected.

Furthermore, the conveyance device 100 comprises an intermediate member 82 between the base member 81 and the holding member 83, the intermediate member 82 is driven relative to the base member 81 by the first chain 84, and the holding member 83 is driven relative to the intermediate member 82 by the second chain 85. Thus, the first chain 84 and the second chain 85 are used in the advancing of the holding member 83. The chains 84, 85 elongate due to use, and the elongation of chains 84, 85 as a whole may change with each advance, depending on various factors such as the weight of workpiece W. According to the conveyance device 100, shifting of the holding member 83 due to the elongation of the chains 84, 85 can be automatically corrected.

Furthermore, in the conveyance device 100, the optical distance sensor 86L is positioned and oriented so as to be capable of measuring the distance to the stock area S, and the controller 70 has an autonomous learning mode which is configured so as to measure the actual distance to each stock area S with the optical distance sensor 86L, determine the advanced position P1 of the holding member 83 for each stock area S based on the measured actual distance from the optical distance sensor 86L to each stock area S, calculate the basic rotational speed of the motor M for each stock area S based on the determined advanced position P1 for each stock area S, and store the calculated basic rotational speed for each stock area S in the memory 72. The distance to the stock areas S may vary among the plurality of stock areas S depending on various factors (for example, assembly accuracy of the pallet stocker 2, earthquakes, etc.). In the conveyance device 100, the advanced position P1 can be autonomously learned for each stock area S by the autonomous learning mode. Thus, even in the case in which the distance to the stock area S varies, the holding member 83 can properly access each stock area S.

Furthermore, in the conveyance device 100, the optical distance sensor 86L is positioned and oriented so as to be capable of emitting light toward the stock area S, and the controller 70 has a product confirmation mode in which it is judged that a product is present in a stock area. S when light emitted toward the stock area S returns to the optical distance sensor 86L within a predetermined period, and it is judged that a product is not present in a stock area S when light emitted toward the stock area S does not return to the optical distance sensor 86L within a predetermined period. Thus, for example, it is possible to prevent an additional product from being erroneously conveyed to a stock area S in which a workpiece W and/or pallet P is already present.

Though the embodiments of the conveyance device have been described, the present invention is not limited to the embodiments described above. A person skilled in the art would understand that various modifications can be made to the embodiments described above.

DESCRIPTION OF REFERENCE SIGNS

2 pallet stocker (storage shelf)
70 controller
71 processor
72 memory (storage unit)
81 base member
82 intermediate member
83 holding member
84 first chain
85 second chain
86 optical distance sensor
100 conveyance device
M motor
P pallet (product)
P1 advanced position
P2 retracted position
S stock area
T target
W workpiece (product)

The invention claimed is:

1. A conveyance device for conveying a product acquired from a storage shelf, the conveyance device comprising:
a base member which is moved along a plurality of stock areas of the storage shelf,
a holding member which holds the product and which moves between an advanced position and a retracted position relative to the stock areas along a guide provided on the base member,
a motor for advancing and retracting the holding member,
a target provided on the holding member,
an optical distance sensor for measuring a distance to the target, the optical distance sensor being arranged outside an area in which the holding member moves, being oriented so as to emit light in an inclined direction relative to a movement direction of the holding member, and being positioned so as to face the target of the holding member when the holding member is in the advanced position, and
a controller for controlling the motor and the optical distance sensor, wherein
a storage unit of the controller stores coordinate values of the advanced position and a basic rotational speed of the motor for moving the holding member to the advanced position, and
a processor of the controller is configured so as to:
advance the holding member by imparting the basic rotational speed to the motor,
measure, with the optical distance sensor, an actual distance of the advanced holding member from the optical distance sensor to the target,
calculate a corrected distance for moving the holding member to the advanced position based on the coordinate values of the advanced position stored in the storage unit and the measured actual distance from the optical distance sensor to the target, and
move the holding member with the motor based on the calculated corrected distance.

2. The conveyance device according to claim 1, further comprising an intermediate member which is configured so as to move along the guide of the base member between the base member and the holding member, wherein
the intermediate member is driven relative to the base member by a first chain, and
the holding member is driven relative to the intermediate member by a second chain.

3. The conveyance device according to claim 1, wherein the optical distance sensor is positioned and oriented so as to be capable of measuring distances to the stock areas, and the controller has an autonomous learning mode which is configured so as to:
measure an actual distance to each stock area with the optical distance sensor,
determine the advanced position of the holding member relative to each stock area based on the measured actual distance from the optical distance sensor to each stock area,
calculate the basic rotational speed of the motor for each stock area based on the determined advanced position for each stock area, and
store the calculated basic rotational speed for each stock area in the storage unit.

4. The conveyance device according to claim 1, wherein the optical distance sensor is positioned and oriented so as to be capable of emitting light toward the stock areas, and
the controller has a product confirmation mode which is configured so as to:
judge that the product is present in the stock areas when light emitted toward the stock areas returns to the optical distance sensor within a predetermined period, and
judge that the product is not present in the stock areas when the light emitted toward the stock areas does not return to the optical distance sensor within the predetermined period.

* * * * *